Nov. 18, 1952   J. J. FRANSEN, SR., ET AL   2,618,493
TRAILER SKIRT
Filed Feb. 28, 1951   2 SHEETS—SHEET 1
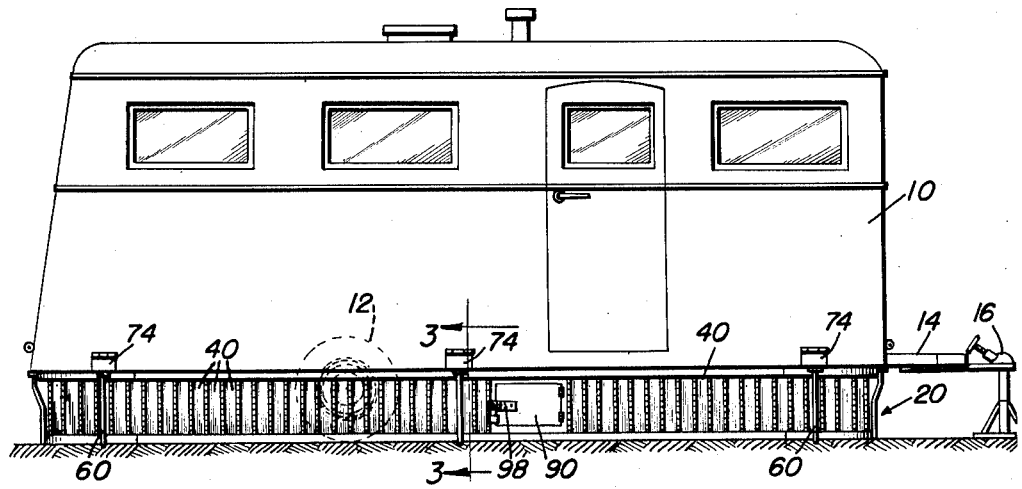
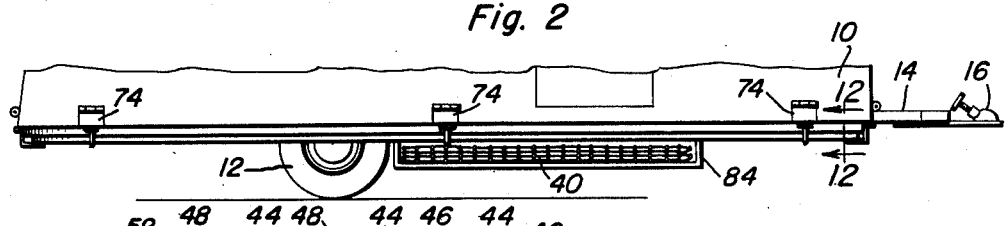
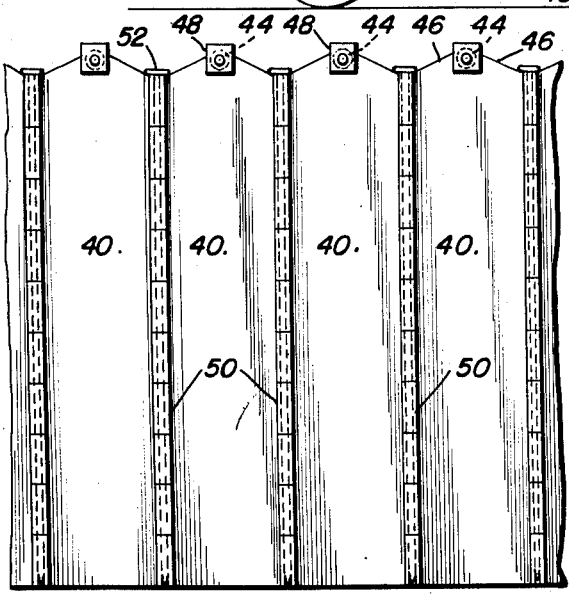
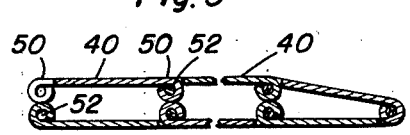
John J. Fransen, Sr
Robert Fransen
William Fransen
INVENTORS.

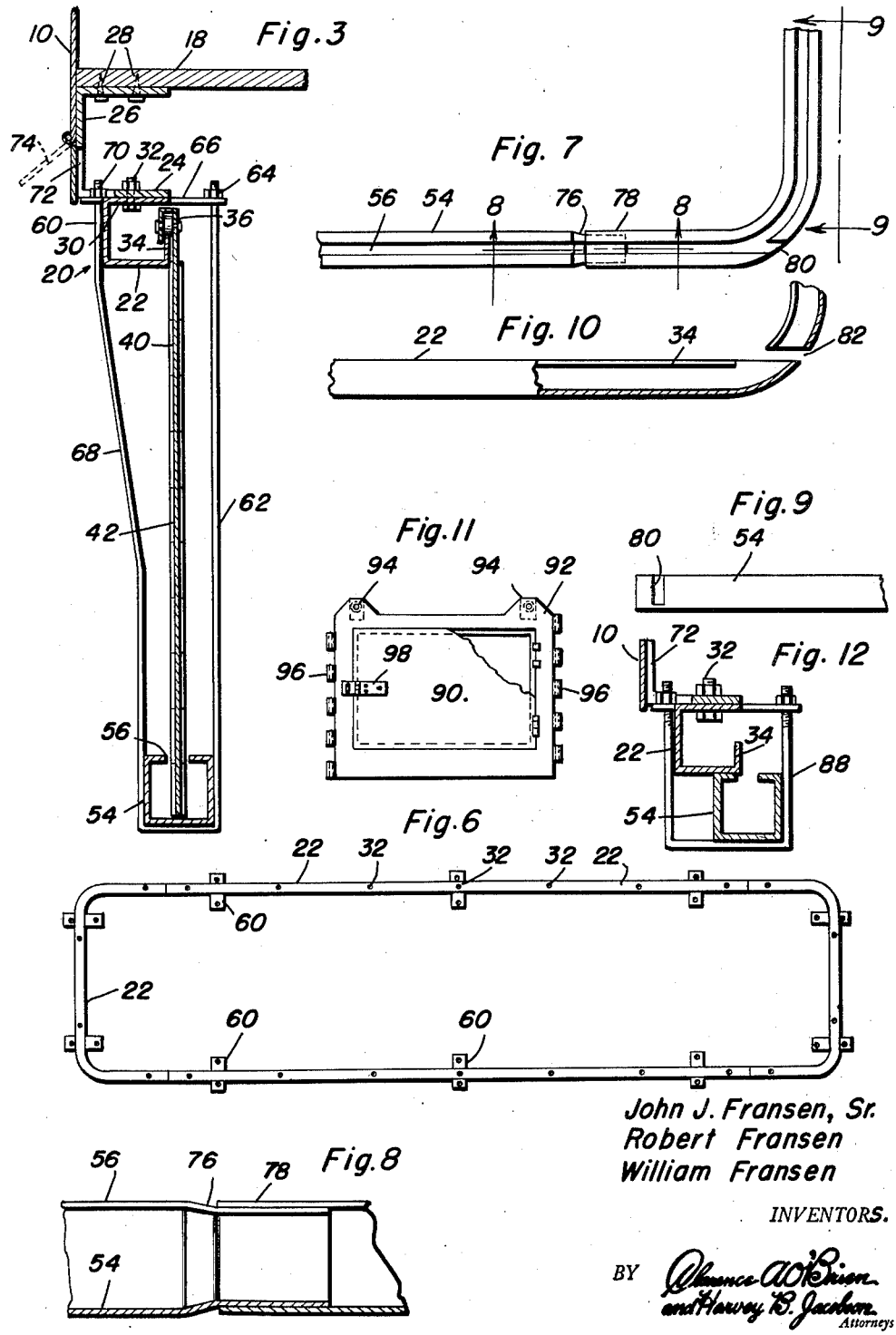

Patented Nov. 18, 1952

2,618,493

UNITED STATES PATENT OFFICE 2,618,493

TRAILER SKIRT

John J. Fransen, Sr., Robert Fransen, and William Fransen, Freeport, Ill.

Application February 28, 1951, Serial No. 213,244

3 Claims. (Cl. 280—150)

This invention relates to new and useful improvements in portable housing structures, and more particularly to structures of the trailer type.

It is an object of this invention to provide a trailer with a skirt made in accordance with this invention, and which is adjustable and readily installed on various types and sizes of trailers.

It is another object of the invention to provide trailer housing units with adjustable skirts which are easily installed so as to make the living in such trailers more comfortable in winter months and to improve their appearance.

Another object is to provide a trailer skirt structure which can be installed on a trailer so as to provide a storage space therebeneath, the trailer skirt unit being formed in sections which are adapted to be fastened together to form an enclosure under the trailer which may be locked to provide a secure storage place.

Another object is to provide a trailer skirt which can be easily positioned about a trailer body structure, even when the same is located in a crowded space, and which skirt structure can be readily demounted as desired, the skirt being formed of sections which can be folded up and conveniently stored beneath the trailer body during transportation.

Still another object of the invention is to provide a trailer skirt which is economical to manufacture and one which can be handled in sections and readily installed on new or used trailers.

Yet another object of the invention envisions a trailer skirt which is constructed of portable sections which are pivoted together and suitably supported on a track mounted on the underside of the trailer body and extending therearound.

Various other objects and advantages will be apparent as the invention is described in more detail. Although the novel features which are believed to be characteristic of this invention will be pointed out more particularly in the claims appended hereto, the invention itself as to its further objects and advantages and manner in which it may be carried out, may be better understood by referring to the following description taken in connection with the accompanying drawings in which a specific embodiment thereof has been set forth for purposes of illustration.

In the drawings:

Figure 1 is an elevational view of a trailer comprising a skirt embodying the novel features of this invention;

Figure 2 is a similar elevational view, as in Figure 1 and illustrating the trailer skirt removed and folded up and stored beneath the trailer body, the body of the trailer being shown broken away;

Figure 3 is a detail sectional view on an enlarged scale, taken through the trailer skirt substantially on the line 3—3 of Figure 1 and looking in the direction of the arrows;

Figure 4 is an elevational view of the trailer skirt shown on an enlarged scale and partly broken away, and illustrating the sectional construction of the skirt, the sections being hinged together;

Figure 5 is a detail sectional view illustrating a number of sections of the trailer skirt of the invention in folded position;

Figure 6 is a plan view of the upper track on which the trailer skirt is supported;

Figure 7 is a fragmentary plan view of a portion of the lower track guideway for the trailer skirt;

Figure 8 is a fragmentary sectional view of a portion of the lower track guideway jointure section, illustrated in Figure 7, shown on an enlarged scale, and taken on the line 8—8 of Figure 7;

Figure 9 is a fragmentary detail view of the trailer skirt;

Figure 10 is a fragmentary detail view partly in section of the upper track;

Figure 11 is an elevational view of a gate forming a section of the trailer skirt; and Figure 12 is a detail sectional view taken substantially on the line 12—12 of Figure 2 and looking in the direction of the arrows.

Referring to the drawings more in detail and wherein like reference characters refer to like parts throughout the several figures, the numeral 10 indicates generally a trailer body, which is of conventional construction and suitably mounted on a chassis supported on the wheels 12, the trailer being provided with a tongue 14 and swivel coupling member 16 for attaching the same to an outomobile. Removably secured to the lower part of the trailer body 10, as to a frame member 18, is a trailer skirt constructed in accordance with this invention and generally designated 20.

The trailer skirt 20, as best illustrated in Figure 3, comprises a channel member 22 of C-shaped cross section which is secured to a horizontally extending leg or flange 24 of a channel member 26 of U-shaped cross section and which, in turn, is suitably fastened to the frame 18 along the opposite integral leg 27, as by means of the stud bolts 28. The upper horizontally extending flange portion 30 of the channel 22 is secured to the underside of the leg 24 of the member 26 at spaced intervals therealong, as by means of bolts 32. The upstanding flange 34 of the member 22 forms a track for movably supporting the rollers 36 which are suitably journaled at the top of a skirt section or panel 40.

The trailer skirt panel members 40, as illustrated in Figure 4, preferably comprise an elongated depending body portion 42 having an uppermost central apex portion 44 with contiguous opposite sloping side edge portions 46. Suitably secured, as by welding, to the central apex portion, is an inverted U-shaped strap 48 in which is suitably journaled a roller 36 which in turn is adapted to be supported on the flange track 34, as illustrated in Figure 3. If desired, the strap 48 may be formed as an integral part of the trailer skirt panel 40, as indicated in Figure 3. Along opposite sides of the trailer skirt panels 40 are piano hinges 50, the contiguous skirt panels being suitably pivoted together by means of a pin 52. The trailer skirts panels or sections 40 are preferably made in different lengths and are supplied in any quantity desired so that the user can fit the skirt sections together and mount the skirt on the track 34, as described.

For guiding and preventing lateral swaying of the skirt sections or panels 40, a lower U-shaped track member 54 is suitably supported below the skirt 40, the U-shaped track member 54 being provided with a central opening or slot 56 for receiving the lower end portion of the trailer skirt and guiding the same, as illustrated in Figure 3. To support the lower track 54 in proper position to guide the skirt, elongated U-bolts 60 are mounted at spaced intervals around the trailer body, as illustrated in Figure 1. These U-shaped bolts 60 comprise a depending straight section 62 which is arranged to be positioned on the inner side of the skirt and fastened as by means of a bolt 64 to a flange extension 66 on the C-shaped member 22, and an integral leg which is bent outwardly, as at 68, engaging over the said C-shaped member and is suitably secured at its upper end to the horizontally extending flange portion 24 on the channel 26, as by means of a bolt 70. To permit ready access to the bolts 64 and 70, as when it is desired to remove or install the trailer skirt panels, suitable apertures 72 are provided in the channel 76 and a door flap 74 arranged to cover the opening, as illustrated in Figures 1 and 3. The lower track 54 is preferably made in sections which are joined together as illustrated in Figure 8, the sections being suitably united as by providing a reduced diameter section as shown at 76 which is arranged to telescope within the contiguous section, as at 78.

As illustrated in Figures 7 and 10, the lower trackway 54 and upper trackway 22 are provided with open sections 80 and 82 respectively, at the corner or curved sections of the trailer body to permit the slipping off or on of the trailer skirt sections or panels 40. When it is desired to remove the trailer skirt panels, as when the trailer is to be moved, the trailer panels are suitably folded upon themselves as illustrated in Figure 5 and stored beneath the trailer in a suitable frame member such as shown at 84 in Figure 2. Further, upon dismounting of the U-bolts 62 for removal of the skirt panels 40, the same are replaced by a shorter U-bolt 88, as shown in Figure 12. As illustrated, the shorter type U-bolt 88 is constructed so as to fit the bolt holes 64 and 70 and retain the lower track member 54 fixedly against the upper track 22 as shown in Figure 12.

To provide suitable means for gaining access to the enclosure formed by the trailer skirt 20, a door means 90 is arranged for support in a frame 92 which, in turn, is arranged to be movably supported on the track 34 by rollers 94. Opposite side edges of the frame 92 are provided with piano hinge sections 96 which are adapted to fit piano hinge sections 50 of the trailer skirt panels 40. By this construction the door 90 may be shifted to the desired location to permit ready access to the enclosure beneath the trailer body. The door 90 may suitably be provided with latch means 98 whereby the same may be locked as desired.

From the foregoing description and illustration of a specific embodiment of the trailer skirt of this invention, it will be readily understood how the same will be installed and demounted during use, and accordingly, further explanation and description is believed to be unnecessary.

While in the foregoing description there has been shown and described the preferred embodiment of this invention, it will be understood, of course, that minor changes in the details of construction, and substitutions may be made in the combination and arrangement of parts without departing from the spirit and scope of the invention as claimed.

Having described the invention, what is claimed as new is:

1. The combination of a trailer body, means on the underside of said trailer body mounting an upper trackway, a lower trackway detachably carried by said mounting means, a skirt extending between said trackways to substantially close the space between the bottom of said trailer body and its supporting surface, said skirt being supported by said upper trackway and guided by said lower trackway.

2. The combination of a trailer body, means on the underside of said trailer body mounting an upper trackway, a lower trackway detachably carried by said mounting means, a skirt extending between said trackways to substantially close the space between the bottom of said trailer body and its supporting surface, the weight of said skirt being carried entirely by said upper trackway through rollers on said skirt, said lower trackway preventing transverse movement of the bottom of said skirt.

3. The combination of a trailer body, means on the underside of said trailer body mounting an upper trackway, a lower trackway detachably carried by said mounting means, a skirt extending between and carried by said trackways to substantially close the space between the bottom of said trailer body and its supporting surface, said trackways extending around the periphery of the trailer body, said skirt being flexible and slidable longitudinally between said trackways.

JOHN J. FRANSEN, Sr.
ROBERT FRANSEN.
WILLIAM FRANSEN.

REFERENCES CITED

The following references are of record in the file of this patent:

UNITED STATES PATENTS

| Number | Name | Date |
|---|---|---|
| 398,776 | Finch | Feb. 26, 1889 |
| 781,665 | Kusch | Feb. 7, 1905 |
| 1,405,485 | Callery | Feb. 7, 1922 |
| 1,417,736 | Heygate | May 30, 1922 |
| 1,651,453 | Harrison | Dec. 6, 1927 |
| 1,731,439 | Riehl | Oct. 15, 1929 |
| 1,801,645 | Sherman | Apr. 21, 1931 |

FOREIGN PATENTS

| Number | Country | Date |
|---|---|---|
| 447,927 | Great Britain | May 28, 1936 |